Dec. 30, 1952  J. HERTRICH  2,623,615
SELF-EQUALIZING BRAKE
Filed April 28, 1949
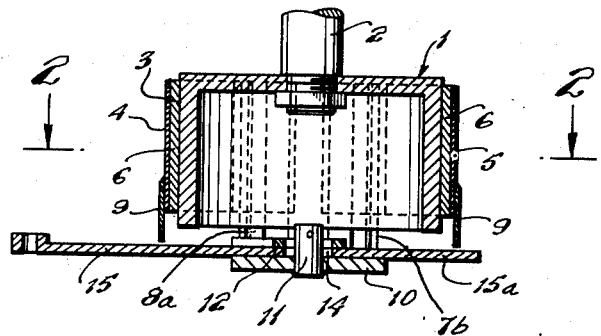
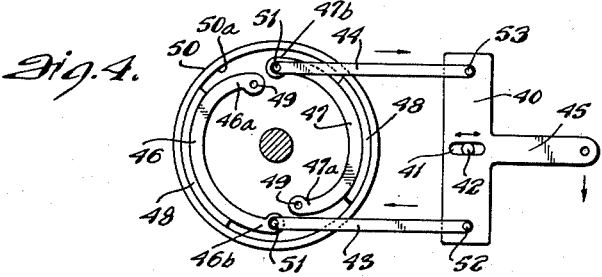
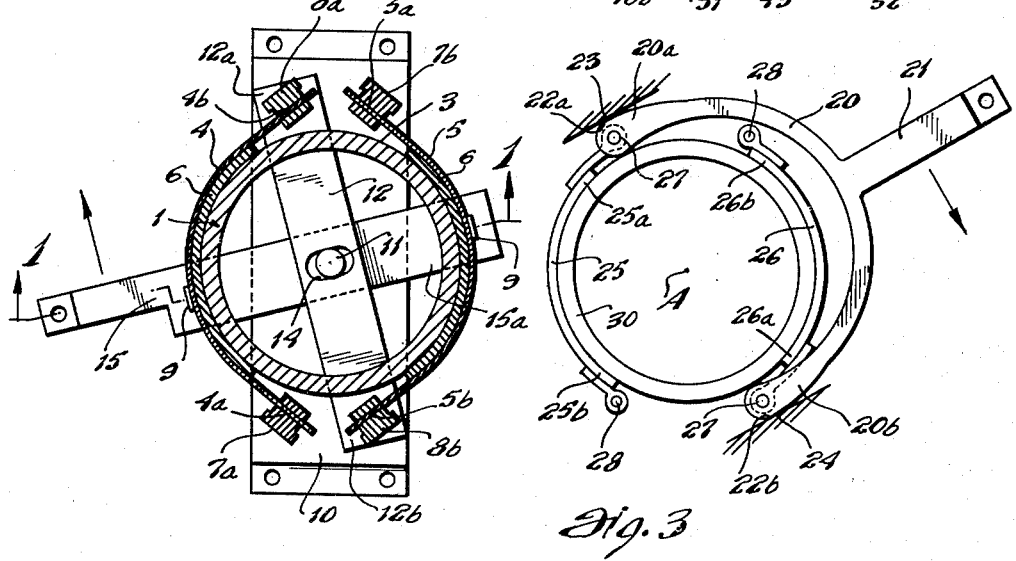
INVENTOR.
JOSEPH HERTRICH
BY
ATTORNEYS Patented Dec. 30, 1952

2,623,615

UNITED STATES PATENT OFFICE 2,623,615

SELF-EQUALIZING BRAKE

Joseph Hertrich, Hamilton, Ohio, assignor to The Western States Machine Company, Hamilton, Ohio, a corporation of Utah Application April 28, 1949, Serial No. 90,148

9 Claims. (Cl. 188—75)

This invention relates to a new self-equalizing brake which is constructed and operates so as to balance automatically the pressures of oppositely acting friction elements against a rotary brake drum.

The invention can be embodied in very simple and inexpensive mechanisms that always apply the friction elements under evenly balanced pressures. This makes it practical, in many applications of friction band brakes or the like, to dispense with close dimensional tolerances in the manufacture of the friction elements and to eliminate painstaking adjustments often required in their assembly or use.

Brake mechanisms with which this invention may be embodied make use of a rotary brake drum presenting a cylindrical braking surface, together with a fitting pair of oppositely disposed movable friction elements such as arcuate brake bands or brake shoes. Each friction element has a relatively fixed end and a relatively loose end. The two loose ends generally are located at points on opposite sides of the axis of the drum, substantially on a diameter thereof, where they are movable oppositely along substantially parallel lines substantially normal to that diameter in order to engage or release the brake.

According to this invention, a rigid brake operating member is provided to extend across the space between said lines of action of the two loose ends, and this cross member carries at its opposite ends rigid arms connecting its ends with said loose ends so that the latter are moved by the cross member. The cross member is mounted for angular movement about a central perpendicular axis equidistant between its ends, so that a suitable turning movement applied to it about that axis will produce opposite forces upon the connected loose ends of the friction elements. It is confined against displacement bodily away from said axis toward either of the lines of action of said loose ends; but at the same time it is kept free to shift transversely relative to that axis in either direction parallel to those lines. Finally, provision is made for applying a suitable turning movement to the cross member, for which purpose a braking force may be applied at right angles to a lever arm extending transversely from the middle of the cross member.

Accordingly, the braking force applied to the lever arm produces a turning movement about said axis of the cross member, which results at the connected loose ends of the friction elements in two equal and opposite forces at right angles to the direction of the applied force. These two forces form and continue to act as a couple always pressing the respective friction elements evenly and oppositely against the surface of the drum. Since the cross member is free to shift bodily in the direction of either of the couple-forming force, any inequality or unbalance arising between them must produce its own correction through a compensating shift of position of the cross member. In this way the friction elements are assured of always acting with equal pressures on the surface of the brake drum, and efficient brake operation with long serviceability of friction linings may be obtained even though little or no precision be used in the construction, assembly or adjustments of the friction elements.

The present invention may be applied to various forms and arrangements of brake mechanisms, including brakes having either internal or external friction elements.

Where the brake drum is sufficiently unobstructed at one end, the cross member may be fulcrumed on a fixed pin coaxial with the drum so as to extend diametrically across the unobstructed end of the drum to its end connections with the loose ends of the friction elements. A slot may be formed transversely in the cross member with parallel sides closely engaging the fixed fulcrum pin, so that the cross member is always free to assume a force-equalizing position.

According to another embodiment, a similar slotted cross member engaging a central fulcrum pin may be located entirely to one side of the brake drum, with the ends of the cross member connected to the loose ends of the friction elements by parallel rigid links swiveled at their ends.

A brake drum having external friction elements and axial obstructions at both ends of the drum can be provided with a cross member working about the drum axis by forming the cross member as an external yoke that embraces the drum and has integral arms swiveled to the loose ends of the friction elements. The ends of these arms are formed with external convexly curved surfaces confined between fixed parallel abutment surfaces which correspond, in effect, to widely spaced sides of a transverse slot of the character mentioned above. When a braking force at right angles to the abutments is applied to a lever arm projecting from the middle of the yoke, the yoke moves relative to the abutments about the axis of the drum so as to divide the force equally between the two friction elements.

The nature of this invention and suitable ways of practicing it will be further understood from the following detailed description and the accompanying drawings of illustrative embodiments, while the characteristic features of the invention will be defined particularly in the appended claims.

In the drawings:

Fig. 1 is a vertical cross section through one form of a self-equalizing brake embodying the invention, as viewed approximately from line 1—1 of Fig. 2;

Fig. 2 is a horizontal cross section through the same brake, taken approximately along line 2—2 of Fig. 1;

Fig. 3 is a diagram of a second embodiment in which all the brake-operating elements are outside and yet coaxial with the rotary drum; and Fig. 4 is a schematic view of a third embodiment wherein the brake-operating cross member is disposed entirely to one side of the brake drum.

As seen in Fig. 1, a cylindrical brake drum 1 is carried on an axial shaft 2 and has an external braking surface 3 adapted to be engaged by a pair of oppositely arranged arcuate friction brake bands 4 and 5 so as to decelerate the shaft. Each band is fitted with a suitable friction lining 6 on its inner side.

As seen in Fig. 2, one end 4a of band 4 is fixed near to the drum surface by means of an anchor post 7a which is mounted on a fixed base plate 10 extending across the end of drum 1 opposite shaft 2. The other or loose end 4b of band 4 is held by a similar post or connector arm 8a, but this arm, instead of anchoring the band end in a fixed relation to the drum, couples it to one end 12a of a movable cross member 12 overlying base plate 10. The other brake band 5 has a fixed end 5a held by anchor post 7b on base plate 10 in diametrically opposite relation to the fixed end 4a of band 4; and band 5 has a loose end 5b held by connector arm 8b to the other end 12b of the movable cross member 12 in diametrically opposite relation to the loose end 4b of band 4.

Extending transversely from the middle of the cross member is a lever arm 15 by which the friction elements are forced against the drum surface 3 whenever braking force is applied to arm 15 in the direction of the arrow in Fig. 2. This arm may cross member 12 and extend beyond it at 15a so that parts of 15 and 15a adjacent to projecting fingers 9 on the bands 4 and 5 may serve as stops to keep the bands in proper position relative to the drum.

The brake operating unit comprising cross member 12 and lever arm 15 is articulated on a fixed center pin 11 which is coaxial with drum 1 and the brake bands. Pin 11 is mounted on the base plate 10 and fits through a slot 14 formed along the central transverse axis of the cross member. The sides of the slot are perpendicular to the braking force applied to arm 15, and they abut oppositely against pin 11 to keep the cross member from moving bodily in either direction along the line of that force; yet the cross member can turn about the axis of the pin to engage or disengage the friction elements, and it can move also in either direction along the slot 14.

A braking force applied to lever arm 15 in the indicated direction therefore becomes a torque urging member 12 about the axis of pin 11 so as to pull the loose ends of the brake bands in parallel though opposite tangents and thus force the bands against the drum. The directions of the forces exerted at the band ends are substantially parallel to the elongation of slot 14, and it results that any tendency of the force on one band to exceed materially the force being exerted on the opposite band must produce a compensating lateral displacement of the cross member with respect to the fulcrum pin. In this way the pressures of application of the two bands against the drum are kept equalized at all times.

It will be evident that there may be liberal tolerances or variations in the dimensions of the two brake bands or in their respective adjustments, without impairing the pressure-equalizing capacity of the brake mechanism.

According to the embodiment of Fig. 3, the functions of the cross member 12, connector arms 8a and 8b and lever arm 15 of Figs. 1 and 2 are performed by a yoke 20 external to the brake elements. Yoke 20 embraces the brake drum 30; has integral arms 20a and 20b carrying at their ends the diametrically opposite loose ends 25a and 26a of arcuate brake bands or shoes 25 and 26, respectively; and has external curved surfaces 22a and 22b on the respective arm ends, which are curved on a radius from the axis A of drum rotation and are confined between fixed parallel abutment surfaces 23 and 24, respectively. The loose ends of the friction elements are fastened pivotally to the yoke ends by pins 27, and the confining surfaces are parallel to the tangents of action of the pins under braking force. The relatively fixed ends 25b and 26b of the respective friction elements are held pivotally in diametrically opposite positions on anchor posts 28.

The yoke has a central transverse lever arm 21 for turning it about the rotation axis A. A braking force applied to arm 21 in the direction of the arrow of Fig. 3 acts about the axis at A and is distributed between the two friction elements 25 and 26 in substantially the manner described above in connection with Figs. 1 and 2. The friction elements are always pressed against the surface of drum 30 under even and self-equalizing pressures because any unbalance of the force distribution produces a compensating body movement of the yoke with respect to the fixed confining surfaces 23 and 24. In this regard the surfaces 23 and 24 perform the function of the sides of the slot 14 in Figs. 1 and 2.

Fig. 4 shows a further embodiment which is like that of Figs. 1 and 2 in that the cross member 40 has a central transverse slot 41 formed with parallel sides engaging a fixed central fulcrum pin 42. Here, however, the cross member is disposed entirely to one side of the brake drum 50, and the brake shown is one having a pair of oppositely disposed internal friction elements such as shoes 46 and 47 fitted with linings 48 to engage the inner periphery 50a of the drum. Ends 46a and 47a of the respective shoes are held by fixed pivot pins 49, while the other or loose ends 46b and 47b are pinned pivotally at 51 to extremities of cross member connector arms 43 and 44, respectively, which are rigid links extending in parallel relation to pivot connections at 52 and 53 with the ends of cross member 40. These connections are equidistant from the axes of slot 41 and fulcrum pin 42. Extending transversely from the cross member in line with slot 41 is an integral lever arm 45 to which force for engaging the brake is applied in the direction of the arrow.

It will be evident that the embodiment of Fig. 4 operates substantially as described above in connection with Fig. 1, although the internal shoes 46 and 47 are pushed against the braking surface 50a. A similarly disposed cross member having pivotally connected rigid bar arms obviously can be used for a brake equipped with external friction elements.

It will be apparent that the principles of this invention as disclosed and claimed herein may be embodied in various forms and arrangements of apparatus without restriction to those herein shown and described by way of illustration.

I claim:

1. A brake mechanism comprising a rotary brake drum, a pair of oppositely disposed friction elements movable to engage the drum, the respective elements having relatively fixed ends and relatively loose ends movable oppositely in substantially parallel lines to press the elements against the drum, a rigid operating member extending across the space between said lines and carrying at its ends arms cooperating with the respective loose ends to move the latter as said member is moved, fixed guiding means for said member confining it against displacement toward either of said lines yet leaving it free to move bodily in either direction parallel to said lines, and a lever arm extending transversely from and acting at the center of said member to receive brake operating force applied at right angles to said lines, so that forces resulting at the loose ends of the friction elements always form a couple.

2. In a brake mechanism comprising a rotary brake drum and a pair of oppositely disposed movable friction elements, said elements having respective parts spaced apart and movable oppositely along substantially parallel lines in order to engage or release the brake, a rigid brake operating member extending across the space between said lines and carrying at its opposite ends rigid arms cooperating with said parts, means supporting said member for displacement thereof angularly about a central perpendicular axis equistant from its ends and transversely relative to said axis in either direction parallel to said lines, said supporting means preventing displacement of said member otherwise relative to said axis, and a lever arm extending transversely from a central portion of said member to receive brake operating force at right angles to said lines.

3. A brake mechanism as described in claim 2, said arms being fixed rigidly to the ends of said cross member and said axis coinciding with the axis of rotation of the brake drum.

4. A brake mechanism as described in claim 3, said cross member extending diametrically across one end of the brake drum, said supporting means comprising a central transverse slot in said member, said slot being formed with parallel sides, and a fixed fulcrum pin extending into said slot in close engagement with said sides to provide said axis.

5. A brake mechanism comprising a rotary brake drum, a pair of oppositely disposed movable friction elements, each element having a relatively fixed end and a relatively loose end, the two loose ends moving oppositely in substantially parallel lines substantially normal to the diameter of the drum in order to engage or disengage the brake, a rigid member extending across the space between the said lines and carrying at its opposite ends rigid arms connected with said loose ends, a central transverse slot in said cross member having parallel sides, a fixed fulcrum pin equidistant between said lines and extending into said slot in abutting relation to its sides so that the cross member is movable angularly about said pin and transversely on it along said slot but is immovable bodily toward either of said lines, and a lever arm extending transversely from a central portion of said cross member to receive brake applying force at right angles to said sides.

6. A brake mechanism as described in claim 5, said cross member extending diametrically across one end of the drum, said arms being fixed rigidly to its ends, and said fulcrum pin being coaxial with the brake drum.

7. A brake mechanism as described in claim 5, said cross member being disposed entirely to one side of the drum, and said arms being substantially parallel links swiveled at their opposite ends to the loose ends of the friction elements and the ends of the cross member, respectively.

8. A brake mechanism comprising a rotary brake drum having an external friction surface, a pair of movable friction elements disposed oppositely about the drum to engage said surface, each element having a relatively fixed end and a relatively loose end, the two loose ends being disposed on a line diametrical to the drum and moving oppositely in order to apply or release the brake, a rigid yoke embracing the drum and having opposite ends swiveled to said loose ends, fixed opposing abutment surfaces outside the respective yoke ends and perpendicular to said line, the yoke ends having external bearing surfaces confined between said abutment surfaces so that the yoke cannot move in either direction along said line but is movable angularly about the axis of the drum and laterally in either direction parallel to the abutment surfaces, and a force applying lever arm extending transversely from a central portion of the yoke.

9. A brake mechanism as described in claim 8, said external bearing surfaces being curved on a radius from the axis of the drum.

JOSEPH HERTRICH.

REFERENCES CITED

The following references are of record in the file of this patent:

UNITED STATES PATENTS

| Number | Name | Date |
| --- | --- | --- |
| 2,019,524 | Dekay | Nov. 5, 1915 |
| 2,029,884 | Majneri | Feb. 4, 1936 |
| 2,045,179 | Doring | June 23, 1936 |
| 2,136,194 | Majneri | Nov. 8, 1938 |

FOREIGN PATENTS

| Number | Country | Date |
| --- | --- | --- |
| 575,220 | Great Britain | Feb. 8, 1946 |